(12) United States Patent
Milligan

(10) Patent No.: US 6,557,497 B1
(45) Date of Patent: May 6, 2003

(54) PROTECTIVE APPAREL FOR DOMESTIC ANIMAL

(76) Inventor: Eileen Milligan, 4179 Heritage Hill La., Ellicott City, MD (US) 21042

( * ) Notice: Subject to any disclaimer, the term of this patent is extended or adjusted under 35 U.S.C. 154(b) by 0 days.

(21) Appl. No.: 10/208,825

(22) Filed: Aug. 1, 2002

(51) Int. Cl.[7] .................. A01K 13/00; A01K 21/00
(52) U.S. Cl. ........................... 119/850; 119/854
(58) Field of Search .................. 119/850, 854, 119/856, 792, 868, 869; 54/79.1, 79.4

(56) References Cited

U.S. PATENT DOCUMENTS

| | | | |
|---|---|---|---|
| 2,222,705 A | * 11/1940 | Conlon | 54/79.1 |
| 2,974,635 A | * 3/1961 | McDowell | 119/854 |
| 3,211,132 A | 10/1965 | Hersh | |
| 3,792,687 A | * 2/1974 | Ehrman | 119/868 |
| 4,290,386 A | 9/1981 | Eiriksson | |
| 4,527,991 A | 7/1985 | Msarsa | |
| 4,813,949 A | 3/1989 | O'Rourke | |
| 4,969,419 A | 11/1990 | Fong | |
| 5,135,522 A | 8/1992 | Fahrenkrug et al. | |
| 5,187,817 A | 2/1993 | Zolner | |
| 5,463,985 A | * 11/1995 | Shover | 119/850 |
| 5,555,847 A | 9/1996 | Kelly | |
| 5,662,640 A | * 9/1997 | Daniels | 604/392 |
| 5,738,047 A | 4/1998 | McNamara | |
| 5,769,030 A | * 6/1998 | Acoff | 119/712 |
| D406,410 S | 3/1999 | Pasqua | |
| 5,954,015 A | 9/1999 | Ohta | |
| 6,142,105 A | 11/2000 | McKnight | |
| 6,234,117 B1 | * 5/2001 | Spatt | 119/850 |
| 6,368,313 B1 | * 4/2002 | Howard | 604/385.09 |

* cited by examiner

Primary Examiner—Charles T. Jordan
Assistant Examiner—John W. Zerr
(74) Attorney, Agent, or Firm—Rosenberg, Klein & Lee

(57) ABSTRACT

Protective apparel (10) for a domestic animal is provided. The protective apparel (10) generally includes a collar (15), a forward piece (20) for fit about an intermediate trunk region of an animal's anatomy, and a hind piece (30) detachably coupled to the forward piece (20) for covering a hind region of the domestic animal's anatomy. The forward piece (20) includes first and second panel portions (21, 22) joined one to the other, and a coupling portion (26, 28) extending from at least one of the panel portions (21, 22) for releasably engaging the collar (15). The hind piece (30) includes first and second end portions (31, 32) between which an intermediate portion (34) extends. The end portions (31, 32) respectively couple in detachable manner to the panel portions (21, 22) of the forward piece (20). The intermediate portion (34) defines a protective panel (340) for absorbent capture of waste excreted by the domestic animal.

20 Claims, 5 Drawing Sheets

PROTECTIVE APPAREL FOR DOMESTIC ANIMAL

BACKGROUND OF THE INVENTION

1. Field of the Invention

The subject protective apparel is generally directed to protective apparel to be worn by a dog, cat, or other species of animal commonly kept as a domestic pet. More specifically, the subject protective apparel provides an adjustable and securely fitted covering for a domestic animal which keeps any waste that might be untimely excreted by the animal from wetting or otherwise soiling the surrounding area.

Pet owners often find it desirable to permit their pets to roam freely about. A prevailing concern, especially when indoors, is that of potential wetting or soiling by the pet's unexpected and untimely excretion of bodily waste. The concern is particularly great where, due to age and infirmity, the pet may suffer from incontinence, or where the pet may not have been sufficiently trained and domesticated. Recognizing the adverse effects of prolonged restraint or confinement within a controlled area, not to mention loss of the pet's companionship during periods of restraint/confinement, however, many pet owners choose to assume the risk of possible wetting and/or soiling and permit the pet to roam free. They resign themselves to tolerating the noxious, unsanitary effects of the occasional wetting or soiling. Consequently, both furniture and flooring within many pet owners' homes are visibly blemished by stains and noticeably permeated by a lingering odor, all of which contribute to a less than ideal sanitary and hygienic setting.

More rigorous training and more vigilant monitoring of the pets would likely reduce the frequency of wetting/soiling, but would still yield only limited remedial effect. The effectiveness of further training may be blunted by such factors as the limited capacities inherent to the pet's particular breed, or simply the individual predisposition of the pet. Vigilant monitoring, of course, would be effective only to the extent that the pet owner would maintain the level of mental energy it requires. Where the untimely excretion is due to the pet's ailment or other infirmity, moreover, no amount of training or vigilant monitoring by the pet owner could prove to be of any real significance.

There is, therefore, a need for more effective and reliable preventive measures by which the unpleasant, unhealthy conditions due to unexpected and untimely waste excretions by pets may be avoided. There is a need, moreover, for such measures which are simple and convenient to implement, and which in use relieve the pet owner the stress of having to maintain a heightened level of alert to avoid wetting/soilage mishaps. There is also the ever present need to employ measures which do not unduly subject the pet to discomfort, such that the pet itself will readily tolerate their use.

2. Prior Art

Various measures for protecting against uncontrolled soilage due to the bodily waste excretions of animals are known in the art. The best prior art known to Applicant includes U.S. Pat. Nos. 6,142,105; 5,555,847; 4,969,419; 4,290,386; 5,738,047; D406,410; 4,813,949; 4,527,991; 3,211,132; 5,954,015; 5,135,522; and, 5,187,817. The prior art heretofore known, however, fails to disclose any devices providing the combined degree of effectiveness, reliability, and ease of use that the subject protective apparel for a domestic animal provides. The prior art devices fail to provide the combination of adjustability, adaptiveness, comfort, and simplicity necessary to realize the degree of practical utility realized by the subject protective apparel.

SUMMARY OF THE INVENTION

It is a primary object of the present invention to provide protective apparel for a domestic animal which effectively and reliably prevents wetting and soilage of the surroundings due to the animal's untimely bodily waste excretions.

It is another object of the present invention to provide protective apparel for a domestic animal which is simple in structure and convenient to fit upon the animal.

It is yet another object of the present invention to provide protective apparel for a domestic animal that is sufficiently adjustable and adaptive to comfortably accommodate the varying bodily configurations of different animals.

These and other objects are attained by the subject protective apparel of the present invention. The protective apparel generally comprises a forward piece for fit about an intermediate trunk region of a domestic animal's anatomy; and, a hind piece detachably coupled to the forward piece for covering a hind region of the domestic animal's anatomy. The forward piece includes first and second panel portions joined one to the other, and a coupling portion extending from at least one of the first and second panel portions for releasably engaging a collar worn by the animal. The hind piece includes first and second end portions between which an intermediate portion extends. The first and second end portions are respectively coupled in detachable manner to the first and second panel portions of the forward piece, with the intermediate portion defining a protective panel for absorbent capture of waste excreted by the domestic animal.

DETAILED DESCRIPTION OF THE PREFERRED EMBODIMENTS

As used herein, the term "domestic" pertains not only to a private household dwelling, but more inclusively to any up-kept setting within which an animal may be permitted. The terms "domestic animal" thus include but are not limited to common household pets, referring more expansively to any animals within human control which may from time to time, if not regularly, dwell within a controlled or up-kept setting. Such animals as monkeys, chimpanzees, and others in human captivity, for instance, may come within the definition of "domestic animal," as may the more common animals like dogs, cats, and rabbits.

Figure 1:
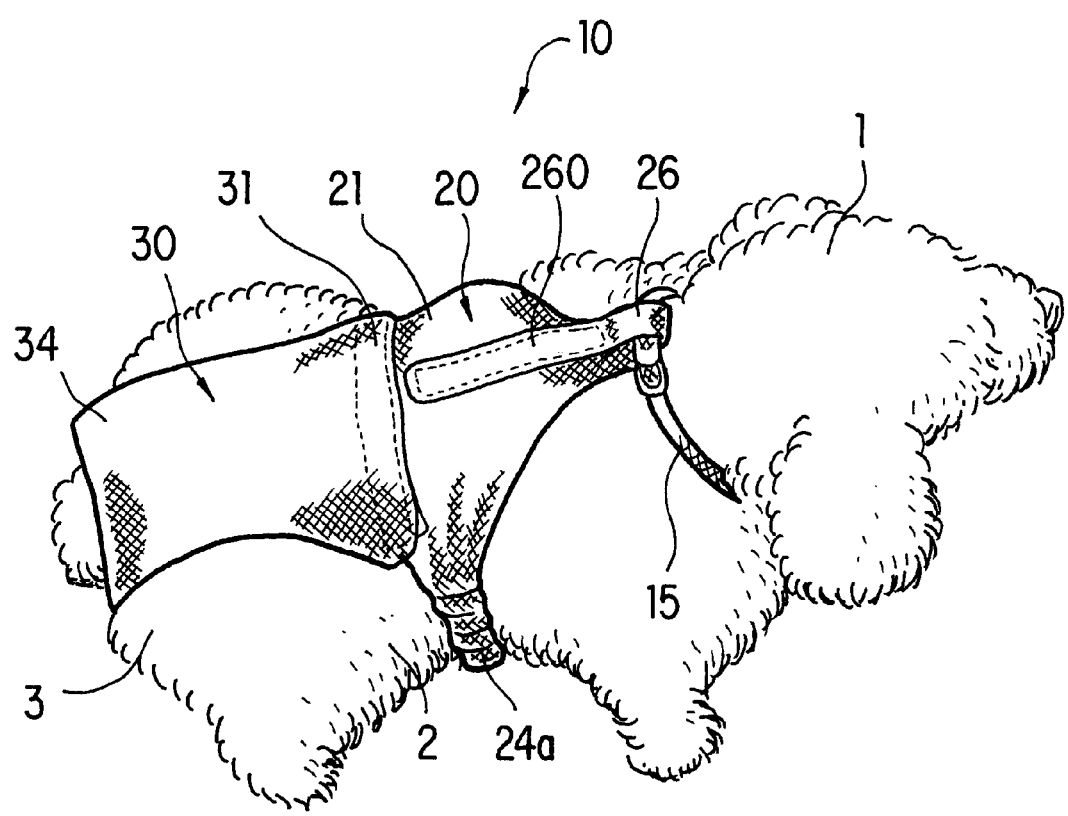
FIG. 1 is a perspective view of a preferred embodiment of the present invention shown in exemplary use, fitted upon a domestic animal.
Figure 2:
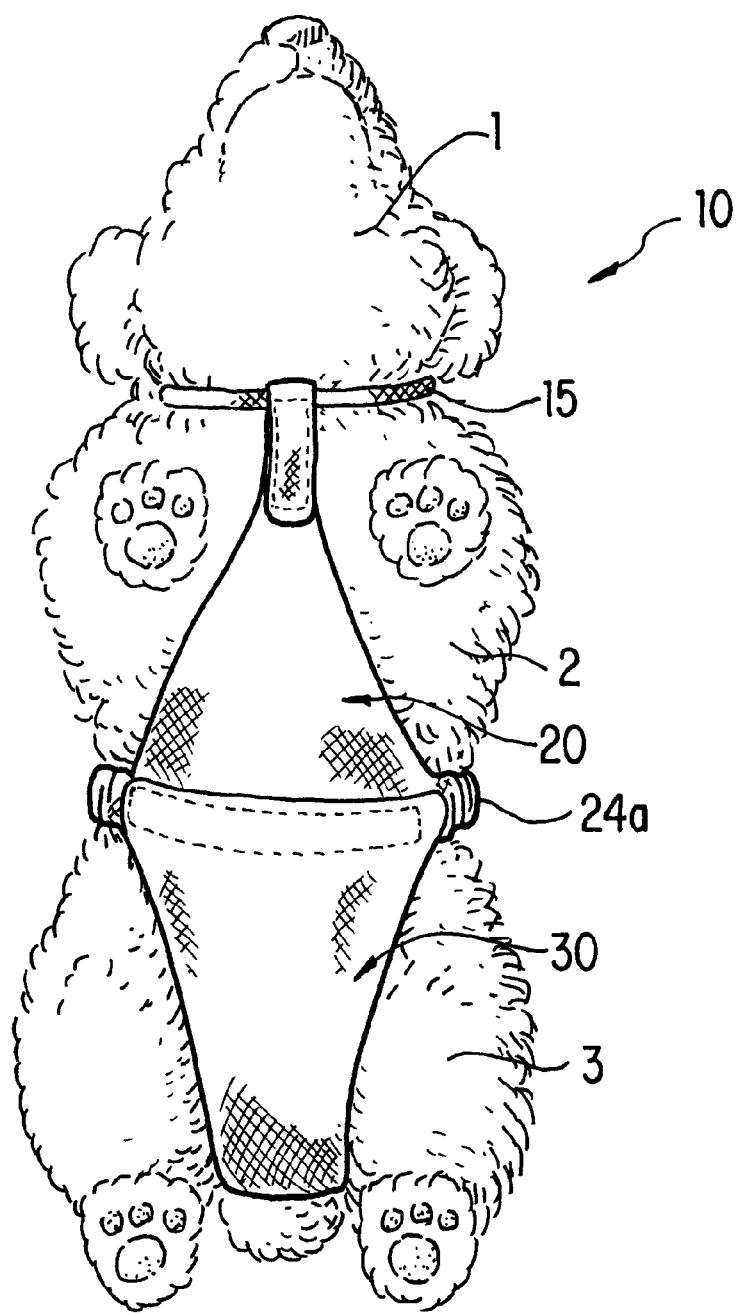
FIG. 2 is a bottom plan view of the preferred embodiment of the present invention as shown in FIG. 1.
Figure 3:
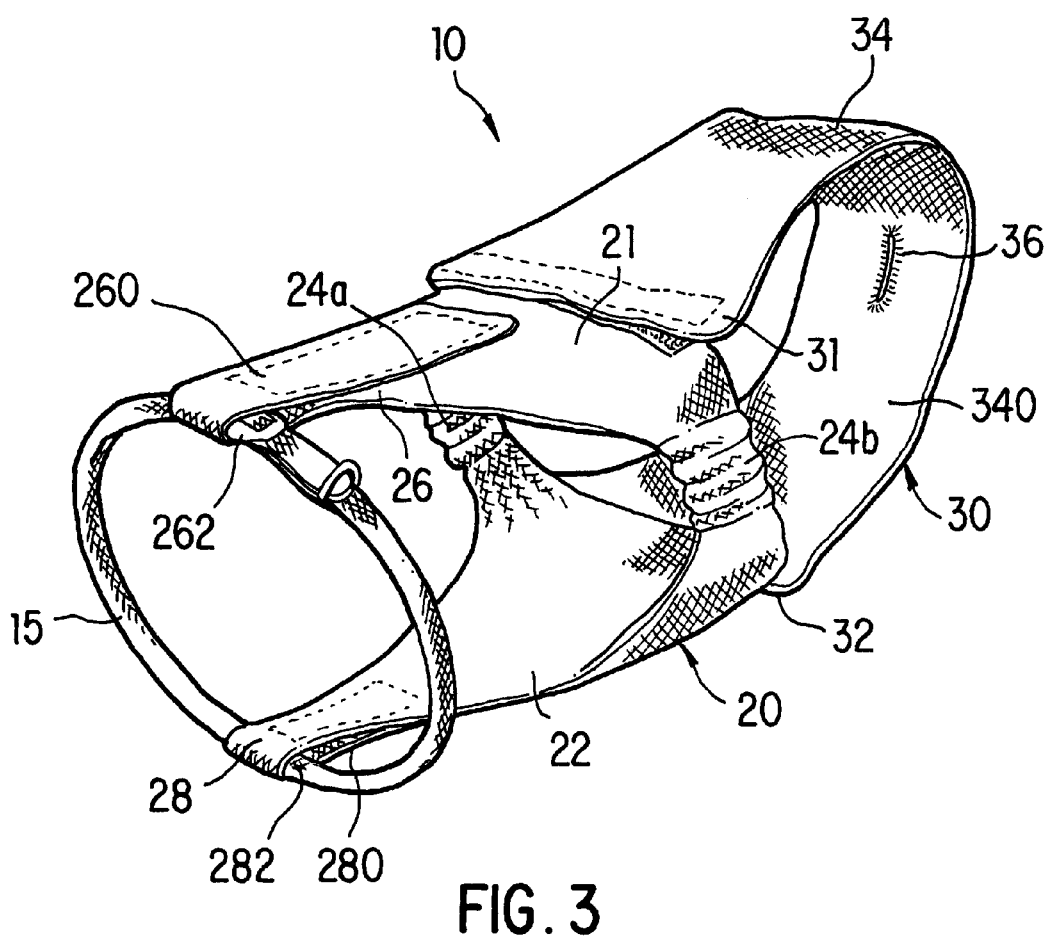
FIG. 3 is another perspective view of the preferred embodiment of FIG. 1 shown in isolation, apart from the domestic animal.
Figure 4:
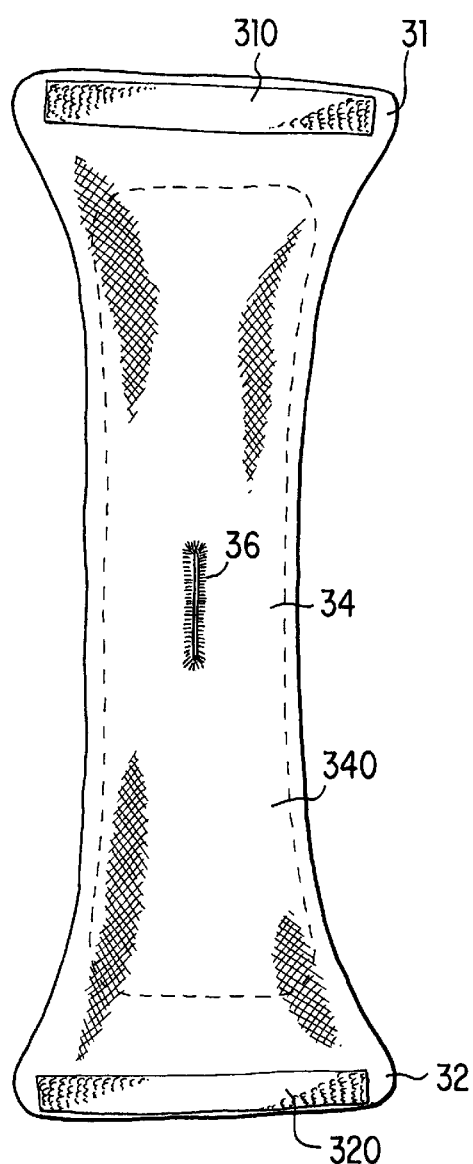
FIG. 4 is a plan view of a portion of the preferred embodiment of the present invention shown in FIG. 3.
Figure 5:
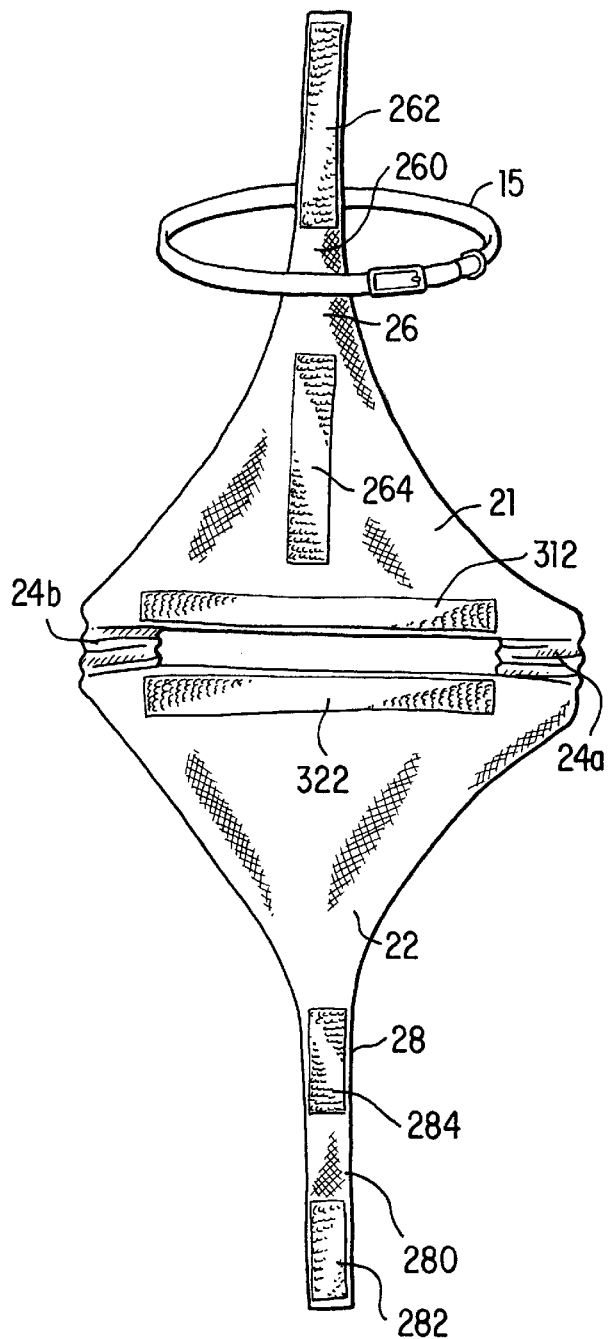
FIG. 5 is a combined plan and perspective view of portions of the preferred embodiment of the present invention shown in FIG. 3; and, FIG. 6 is a partially exploded perspective view of the preferred embodiment of the present invention shown in FIG. 3.
Figure 6:
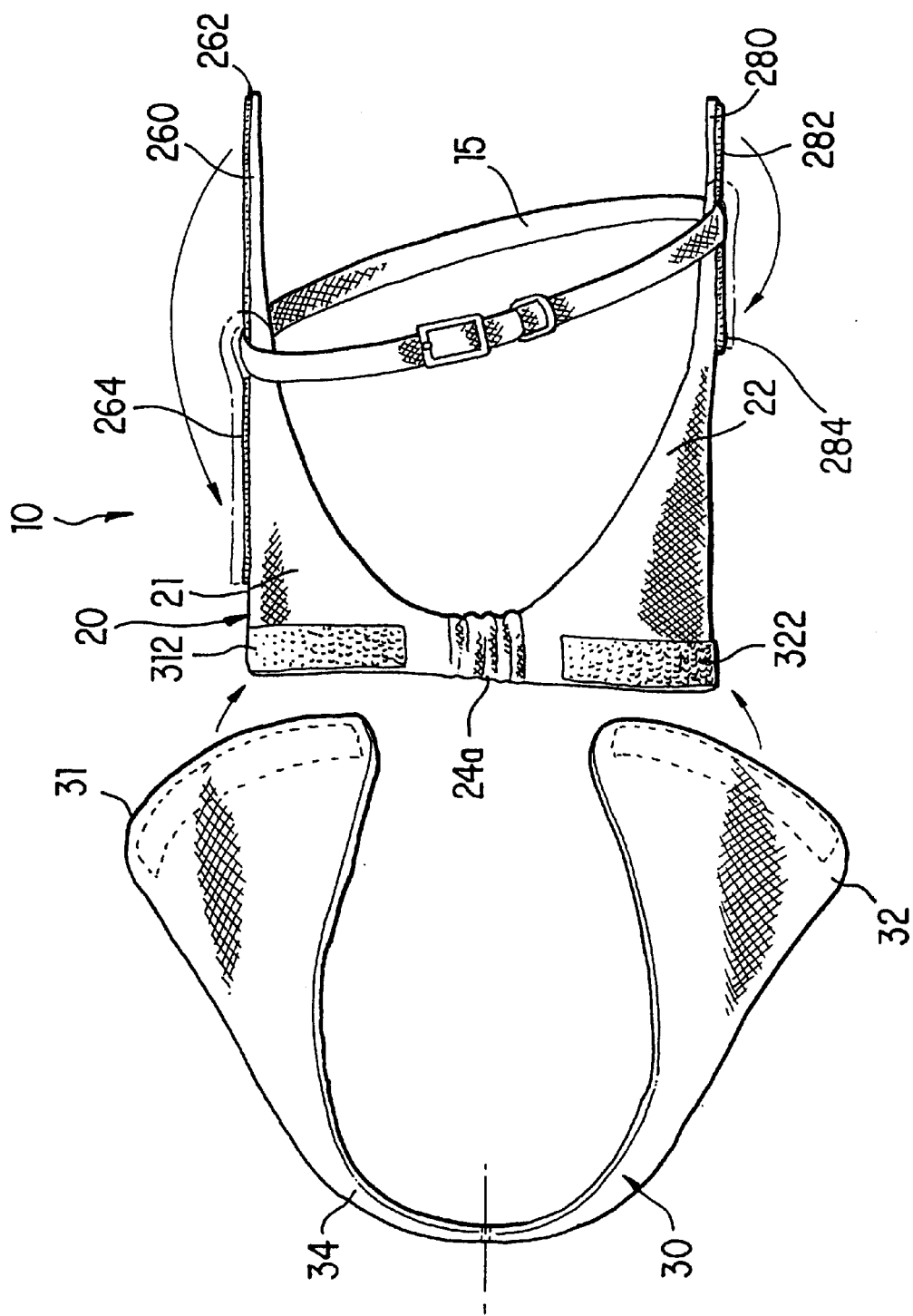

Referring now to FIG. 1, there is shown one embodiment of the subject protective apparel 10 in exemplary use, fitted upon a domestic animal 1. Protective apparel 10 generally comprises a forward piece 20 that fits about an intermediate trunk region 2 of the animal 1 and a hind piece 30 detachably coupled as shown to forward piece 20 which is fitted to the animal's hind region 3. Forward piece 20 is releasably secured to a collar 15 of a type typically worn by dogs, cats, and other domestic animals.

In overall function, forward piece 20, when coupled as shown to the animal's collar 15, effectively forms for the animal 1 a brief, bodice-like article of clothing that remains snugly in place about its intermediate trunk region 2. Configured as it is to be as least obstructive and least inhibiting of the animal's free movements as possible yet securely positioned upon that animal, forward piece 20 serves as the stabilizing base to which hind piece 30 may be attached for retentive support. Hind piece 30, when attached, serves to cover the anal and crotch areas of the animal's anatomy, so as to capture and trap any bodily waste the animal may excrete.

Hind portion 30 thus forms, effectively, a diaper which may be selectively attached to or removed from forward piece 20 depending on the immediacy of the need. When a particular hind piece 30 is soiled, it may be replaced by another hind piece 30. During those periods when the animal's caretaker is reasonably certain that a wetting/soilage mishap will not occur, he or she may then keep hind piece 30 altogether removed to completely free up at least the hind end portion 3 of the animal's torso. The animal may thereafter roam freely wearing only forward piece 20 (and collar 15) until it becomes necessary again to re-attach a hind piece 30.

Such flexibility of use affords numerous advantages. In the case of a canine pup that has not been fully house trained, for example, hind portion 30 may be conveniently removed when the pup is taken outdoors to appropriately relieve itself, then replaced once it is brought back indoors. No significant refitting or readjustment need be made in doing this, as forward piece 20 would have remained in place during the animal's excursion outdoors, even while the animal relieved itself.

Forward and hind pieces 20, 30 are each formed of one or more layers of flexible material. In the exemplary embodiment shown, forward and hind pieces 20, 30 are each formed of a flannel fabric material defining opposed inner and outer surfaces between which one or more internal lining layers may be disposed at various portions, depending on the requirements of the intended application. The layers may include a layer for absorbing liquids, a layer for impermeably containing liquids, and/or any other such layers suitable for the given application. The added weight and ventilation inhibiting effects of such layers, though, may limit their permissible number, as well as their permissible material composition at certain portions of forward and hind pieces 20, 30. Again, such factors would be dependent upon the specific requirements of the intended application.

Any other suitable material known in the art may be used in conjunction with, or in place of, the flannel material shown, so long as the comparable degree of strength, flexibility, weight density, and fine texture sufficient to preserve animal comfort is maintained. Other fabric materials such as a cotton interlock material and/or a resilient Lycra material, among others, may be employed. Preferably, an auxiliary layer is employed to at least partially line the given material and thereby enhance its liquid absorption.

Collar 15 may be of any suitable type known in the art typically placed around the necks of dogs, cats, and other domestic animals. Collar 15 is important to the present invention only to the extent that it provides a point of securement for forward piece 20; hence, the particularities of its compositional and structural makeup is not further discussed herein.

Turning to FIGS. 3–6, forward piece 20 includes an upper panel portion 21 and a lower panel portion 22 joined one to the other, preferably, by a pair of resilient connecting members 24a, 24b. When fitted upon the animal 1, forward piece 20 snugly encircles the animal's intermediate trunk region 2. In the embodiment shown, forward piece 20 is formed with a one piece construction, a portion of which defines an endless loop that must be slipped onto the animal 1 beginning at its front or hind end. Forward piece 20, however, may be formed in alternate embodiments with a multi-piece construction that may better facilitate placement about the animal's intermediate trunk region, where factors such as peculiarities of the given animal's bodily configuration, or physical disability of the pet owner may so necessitate.

Upper and lower panel portions 21, 22 may be detachably joined in those embodiments, permitting the user to freely position the panel portions 21, 22 before joining them, and to thereafter simply separate the panel portions 21, 22 for quick and easy removal. Suitable measures must be employed in such alternate embodiments, however, to ensure the strength and integrity of coupling between panel portions 21, 22. The coupling must be of sufficient construction to withstand the various abrupt bodily contortions of the animal, as well as the likely attempts of the animal to disturb it. Canine pups in particular are quite likely to gnaw and scratch at any point of coupling that is accessible.

Regardless of the structural particularities employed, it is important that forward piece 20 snugly conform to at least a portion of the animal's intermediate trunk region 2. It is preferable in this regard that forward piece 20 so conform in adaptive manner. Toward that end, connecting members 24a, 24b are formed in the present embodiment to be resilient. Connecting members 24a, 24b bias upper and lower panel portions 21, 22 to be drawn respectively against the back and chest/belly of the animal 1. Connecting members 24a, 24b are preferably of such resilience that they do not force undue constriction, and instead afford sufficient give to accommodate the animal's normal uninhibited breathing and movement.

While formed in a generally triangular shape, upper and lower panel portions 21, 22 may be formed with other suitable configurations depending on the actual type of domestic animal 1, the nature of the surroundings, and other factors pertaining to the application for which protective apparel 10 is intended. In the configuration shown, upper and lower panel portions 21, 22 define opposed major panels of a bodice-like article which snugly, though not constrictively, hugs the animal's intermediate trunk region. Extending forward from at least one of the upper and lower panel portions 21, 22 is a coupling portion that releasably engages collar 15 for securement of forward piece 20. Preferably, such coupling portion extends from each of the upper and lower panel portions 21, 22—coupling portion 26 extending from upper panel portion 21 and coupling portion 28 extending from lower panel portion 22.

Coupling portions 26, 28 preferably provide sufficient adjustability in securing to collar 15 that upper and lower panel portions 21, 22 may be disposed selectively in position relative to collar 15. In the embodiment shown, each coupling portion 26, 28 is terminated by a strap member 260, 280 which may be passed forward beyond collar 15, then bent or pivoted thereabout and drawn rearward, thereby defining an engaged coupling loop for that collar 15.

Other means of securement to collar 15 may be employed in alternate embodiments. For instance, one or both coupling portions 26, 28 may be coupled to collar 15 by a separate fastening device of any suitable configuration known in the art. The looped coupling shown in the present embodiment, however, provides a very simple means of effecting a secure coupling that is both easily releasable and readily adjustable. The looped coupling obviates any need to customize or otherwise adapt collar 15 to accommodate the securement.

Each strap member 260, 280 in the present embodiment is preferably hook and loop-fastened to respective upper and lower panel portions 21, 22. Such hook and loop fastening may be effected by using one or more VELCRO or other such fastening strips known in the art. In the embodiment shown, complementary fastening strips 262, 264 are preferably affixed upon corresponding parts of strap member 260 and upper panel portion 21, while complementary fastening strips 282, 284 are preferably affixed upon corresponding parts of strap member 280 and lower panel portion 22.

To enable optimum fit upon the animal 1, one of the strap members 260, 280 may be formed with greater length than the other. Moreover, strap members 260, 280 may be provided with hook and loop fastening strips 262, 282 (and corresponding complementary fastening strips 264, 284, if necessary) configured and positioned differently. In the exemplary embodiment shown, the upper strap member 260 is provided with a longer fastening strip 262 than is lower strap member 28. This permits protective apparel 10 to better accommodate the bodily configurations of the particular dog breed shown—the base of whose neck is such that collar 15 rides thereabout somewhat askew in orientation, with its upper extent trailing its lower extent.

Where positional adjustment of forward piece 20 is necessary, one or both strap members 260, 280 may simply be pulled to unfasten from upper and lower panel portions 21, 22. They may be drawn thereafter to tighten or let out in order that upper and lower panel portions 21, 22 may be set selectively in position and tautness relative to collar 15. Alternatively, forward piece 20 may be conveniently removed or replaced thereafter, without having to undo collar 15.

When fastened to collar 15, forward piece 20 is firmly secured in place so that it may be worn on the animal for extended periods of time without discomforting movement or partial release. The resilient connecting members 24a, 24b which join upper and lower panel portions 21, 22 each preferably includes an elastic component that adaptively draws panel portions 21, 22 one relative to the other to prevent the loose dangling of material—prone to snagging and to destructive gnawing or clawing by the animal itself. The various portions of forward piece 20 are so dimensioned, preferably, that during use forward piece 20 remains free and clear of any bodily waste during its excretion by the animal.

Hind piece 30 serves as the diaper-like article which is detachably secured to forward piece 20. Hind piece 30 includes a pair of end portions 31, 32 between which extends an intermediate portion 34. Together these portions preferably describe an intermediately tapered, hourglass-like contour. End portions 31, 32 detachably couple during use to the rear-most parts of the forward piece's upper and lower panel portions 21, 22. The detachable coupling is preferably effected, again, by using any suitable hook and loop fastening means known in the art. Each end portion 31, 32 in the embodiment shown has affixed thereto a VELCRO-type hook and loop fastening strip 310, 320. Unless the surfaces of upper and lower panel portions 21, 22 are of a fibrous fabric composition (which may be directly engaged by the end portions' fastening strips 310, 320), complementary VELCRO-type hook and loop fastening strips 312, 322 are affixed along the rear-most edges of panel portions 21, 22.

With end portions 31, 32 thereby attached conveniently yet securely to forward piece 20, intermediate portion 34 of hind piece 30 wraps around the anal and crotch regions of the animal's anatomy. Intermediate portion 34 is positioned relative to forward piece 20 to snugly envelop those regions, that it may suitably entrap and capture the animal's waste, as it is excreted.

It is important in this regard that hind piece 30 be adjustable in position with respect to forward piece 20. Toward that end, at least one of the fastening strips 310, 320 affixed to end portions 31, 32, or at least one of the fastening strips 312, 322 affixed to upper and lower panel pieces 21, 22, be suitably extended in width. The extended width would permit a range of adjustment in the effective length of intermediate portion 34 that extends between the rear-most edges of the forward piece's panel portions 21, 22. In the embodiment shown, fastening strips 310, 320 and 312, 322 are configured with suitable widths to collectively yield an ample adjustment range.

Intermediate portion 34 defines a protective panel 340 that absorbently captures the excreted waste. Depending on its material composition, intermediate portion 34 may be augmented by one or more internal or external lining/reinforcement layers which enhance absorbency and/or provide a liquid impermeable barrier. The additional lining/reinforcement layer(s) may, depending on the intended application, include any suitable liquid absorbing component, deodorizing component, or the like known in the art for abating the noxious effects of the animal's waste excretions.

As intermediate portion 34 envelops much of the animal's hind region, an opening 36 is formed therethrough to accommodate its tail. Opening 36 is preferably configured as an elongate slit 36, as this configuration permits opening 36 to be readily self-conforming about the tail irregardless of the various configurations such tail may take. Little if any open access through intermediate portion 34 then remains immediately about the animal's tail while hind piece 30 is in use.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, and certain features may be used independently of other features, all without departing from the spirit or scope of the invention as defined in the appended Claims.

What is claimed is:

1. Protective apparel for a domestic animal comprising:
    (a) a collar;
    (b) a forward piece for fit about an intermediate trunk region of the domestic animal's anatomy, said forward piece including first and second panel portions joined one to the other, and a coupling portion extending from at least one of said first and second panel portions for releasably engaging said collar; and,
    (c) a hind piece detachably coupled to said forward piece for covering a hind region of the domestic animal's anatomy, said hind piece including first and second end portions and an intermediate portion extending therebetween, said first and second end portions being respectively coupled in detachable manner to said first and second panel portions of said forward piece, said intermediate portion defining a protective panel for absorbent capture of waste excreted by the domestic animal.

2. The protective apparel as recited in claim 1 wherein said forward piece includes at least a pair of said coupling portions, each said coupling portion adjustably defining a coupling loop for receiving a portion of said collar therethrough.

3. The protective apparel as recited in claim 2 wherein at least one of said coupling portions of said forward piece is terminated by a strap member bent rearward and detachably coupled to said first panel portion to define one said coupling loop.

4. The protective apparel as recited in claim 3 wherein said coupling portions of said forward piece are each terminated by respective ones of said strap member, each said strap member being fastened by hook and loop to one of said first and second panel portions.

5. The protective apparel as recited in claim 1 wherein said forward and hind pieces are formed of a flexible material.

6. The protective apparel as recited in claim 1 wherein said first and second end portions of said hind piece are detachably fastened by hook and loop to said respective first and second panel portions of said forward piece.

7. The protective apparel as recited in claim 1 wherein said first and second panel portions of said forward piece are joined by a pair of resilient connecting members extending therebetween.

8. The protective apparel as recited in claim 1 wherein said intermediate portion of said hind piece has formed therein a tail opening for receiving therethrough a tail of the domestic animal.

9. The protective apparel as recited in claim 8 wherein said tail opening describes an elongate slit for adaptively accommodating a plurality of tail configurations.

10. Adjustable protective apparel for a domestic animal comprising:

(a) a collar;

(b) a flexible forward piece formed for adaptive fit about an intermediate trunk region of the domestic animal's anatomy, said forward piece including first and second panel portions, a pair of opposed connecting members extending between said first and second panel portions, and first and second coupling portions extending respectively from said first and second panel portions for releasably engaging said collar, each of said first and second coupling portions reconfigurably defining a coupling loop for receiving a portion of said collar therethrough; and, (c) a flexible hind piece detachably coupled to said forward piece for covering a hind region of the domestic animal's anatomy, said hind piece including first and second end portions and an intermediate portion extending therebetween, said first and second end portions being respectively coupled in detachable manner to said first and second panel portions of said forward piece, said intermediate portion defining a protective panel for absorbent capture of waste excreted by the domestic animal.

11. The adjustable protective apparel as recited in claim 10 wherein said first and second coupling portions of said forward piece are each terminated by a strap member pivoted about said collar member and directed rearward to detachably couple to one of said first and second panel portions, each said strap member thereby defining one said coupling loop.

12. The adjustable protective apparel as recited in claim 11 wherein each said strap member is fastened by hook and loop means to one of said first and second panel portions.

13. The adjustable protective apparel as recited in claim 10 wherein said first and second end portions of said hind piece are detachably fastened by hook and loop to said respective first and second panel portions of said forward piece.

14. The adjustable protective apparel as recited in claim 10 wherein said connecting members of said forward piece are elastic.

15. The adjustable protective apparel as recited in claim 10 wherein said intermediate portion of said hind piece has formed therein a tail opening for receiving therethrough a tail of the domestic animal, said tail opening describing an elongate slit for adaptively accommodating a plurality of tail configurations.

16. Adjustable protective apparel for a domestic animal comprising:

(a) a collar;

(b) a flexible forward piece formed for adaptive fit about an intermediate trunk region of the domestic animal's anatomy, said forward piece including upper and lower panel portions, a pair of elastic side connecting members extending transversely between said upper and lower panel portions, and a pair of coupling portions extending respectively from said upper and lower panel portions for engaging said collar in adjustable manner; and, (c) a flexible hind piece detachably coupled to said forward piece for covering a hind region of the domestic animal's anatomy, said hind piece including upper and lower end portions and an intermediate portion extending therebetween, said upper and lower end portions being respectively coupled in detachable manner to said upper and lower panel portions of said forward piece, whereby said intermediate portion is disposed to extend in substantially conformed manner along the hind trunk region of the domestic animal, said intermediate portion defining a protective panel for absorbent capture of waste excreted by the domestic animal.

17. The adjustable protective apparel as recited in claim 16 wherein said coupling portions of said forward piece are each terminated by a strap member looped about a portion of said collar, said strap member having a free end guided to extend rearward and detachably couple to one of said upper and lower panel portions, each said strap member thereby defining one coupling loop.

18. The adjustable protective apparel as recited in claim 17 wherein each said strap member is fastened by hook and loop means to one of said upper and lower panel portions.

19. The adjustable protective apparel as recited in claim 18 wherein said intermediate portion of said hind piece has formed therein a tail opening for receiving therethrough a tail of the domestic animal, said tail opening describing an elongate slit for adaptively accommodating a plurality of tail configurations.

20. The adjustable protective apparel as recited in claim 19 wherein said forward and hind pieces are formed of a resilient flexible material.

* * * * *